United States Patent
Havin et al.

(10) Patent No.: US 7,765,537 B2
(45) Date of Patent: Jul. 27, 2010

(54) PROFILING INTERFACE ASSISTED CLASS LOADING FOR BYTE CODE INSTRUMENTED LOGIC

(75) Inventors: Victor L. Havin, Mountain View, CA (US); Allan K. Pratt, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/283,637

(22) Filed: Nov. 21, 2005

(65) Prior Publication Data
US 2007/0169000 A1 Jul. 19, 2007

(51) Int. Cl.
*G06F 9/44* (2006.01)
(52) U.S. Cl. .................. 717/166; 717/130; 717/167
(58) Field of Classification Search .............. None
See application file for complete search history.

(56) References Cited

U.S. PATENT DOCUMENTS

| | | | | |
|---|---|---|---|---|
| 6,044,467 | A * | 3/2000 | Gong | 726/4 |
| 6,339,841 | B1 * | 1/2002 | Merrick et al. | 717/166 |
| 6,430,570 | B1 | 8/2002 | Judge et al. | |
| 6,457,142 | B1 * | 9/2002 | Klemm et al. | 714/38 |
| 6,496,871 | B1 * | 12/2002 | Jagannathar et al. | 719/317 |
| 6,560,773 | B1 * | 5/2003 | Alexander et al. | 717/128 |
| 6,643,842 | B2 * | 11/2003 | Angel et al. | 717/130 |
| 6,675,381 | B1 * | 1/2004 | Yamaguchi | 717/168 |
| 6,742,178 | B1 * | 5/2004 | Berry et al. | 717/130 |
| 6,754,890 | B1 | 6/2004 | Berry et al. | |
| 6,842,891 | B2 * | 1/2005 | Zhang et al. | 717/101 |
| 6,851,112 | B1 * | 2/2005 | Chapman | 718/1 |
| 6,851,118 | B1 * | 2/2005 | Ismael et al. | 719/330 |
| 6,915,511 | B2 * | 7/2005 | Susarla et al. | 717/166 |
| 7,275,239 | B2 * | 9/2007 | Cuomo et al. | 717/130 |
| 7,275,241 | B2 * | 9/2007 | Choi et al. | 717/143 |
| 7,293,260 | B1 * | 11/2007 | Dmitriev | 717/130 |
| 7,434,215 | B2 * | 10/2008 | Boykin et al. | 717/169 |
| 7,533,389 | B2 * | 5/2009 | Verbeke et al. | 719/332 |

(Continued)

OTHER PUBLICATIONS

Liang et al., Dynamic Class Loading in the Java Virtual Machine, published by ACM 1998, pp. 36-44.*

(Continued)

*Primary Examiner*—Tuan Q Dam
*Assistant Examiner*—Zheng Wei
(74) *Attorney, Agent, or Firm*—Daniel McLoughlin, Esq.; Steven M. Greenberg, Esq.; Carey, Rodriguez, Greenberg & Paul, LLP

(57) ABSTRACT

A data processing system, method and computer program product for profiling interface assisted class loading for byte code instrumented logic can be provided. The system can include a development environment configured for byte code instrumentation of byte streams for instantiation in a virtual machine, such as a Java Virtual Machine (JVM). The system further can include a profiling interface agent, such as a JVM profiling interface (JVMPI) compliant profiling interface agent. Finally, the system can include profiling assisted class loading logic coupled to the agent. The profiling assisted class loading logic can include program code enabled to identify an extension class required for use by an embedded class for a byte code instrumented byte stream and to request the profiling interface agent to load the extension class in the virtual machine.

13 Claims, 2 Drawing Sheets

U.S. PATENT DOCUMENTS

| | | | |
|---|---|---|---|
| 2002/0049963 A1* | 4/2002 | Beck et al. | 717/130 |
| 2002/0062334 A1* | 5/2002 | Chen et al. | 709/200 |
| 2002/0133643 A1* | 9/2002 | Bracha et al. | 709/332 |
| 2003/0041288 A1* | 2/2003 | Kolawa et al. | 714/38 |
| 2003/0163481 A1* | 8/2003 | Blohm | 707/102 |
| 2004/0015600 A1* | 1/2004 | Tiwary et al. | 709/234 |
| 2004/0015936 A1* | 1/2004 | Susarla et al. | 717/166 |
| 2004/0019887 A1* | 1/2004 | Taylor et al. | 717/166 |
| 2004/0054984 A1 | 3/2004 | Chong et al. | |
| 2004/0123279 A1* | 6/2004 | Boykin et al. | 717/158 |
| 2004/0153996 A1* | 8/2004 | Boykin et al. | 717/118 |
| 2004/0158819 A1* | 8/2004 | Cuomo et al. | 717/128 |
| 2004/0163077 A1* | 8/2004 | Dimpsey et al. | 717/130 |
| 2004/0210877 A1* | 10/2004 | Sluiman et al. | 717/130 |
| 2004/0215768 A1* | 10/2004 | Oulu et al. | 709/224 |
| 2004/0221268 A1* | 11/2004 | Nichols et al. | 717/124 |
| 2004/0261069 A1 | 12/2004 | Verbeke et al. | |
| 2005/0039187 A1* | 2/2005 | Avakian et al. | 719/310 |
| 2005/0039190 A1* | 2/2005 | Rees et al. | 719/316 |
| 2006/0130034 A1* | 6/2006 | Beisiegel et al. | 717/166 |
| 2006/0195823 A1* | 8/2006 | Bentolila | 717/127 |
| 2006/0218533 A1* | 9/2006 | Koduru et al. | 717/124 |
| 2006/0225051 A1* | 10/2006 | Kannan | 717/129 |
| 2006/0230320 A1* | 10/2006 | Salvador et al. | 714/38 |
| 2006/0253507 A1* | 11/2006 | Schank et al. | 707/205 |
| 2007/0094675 A1* | 4/2007 | Ryan | 719/330 |
| 2008/0244546 A1* | 10/2008 | Schmelter et al. | 717/158 |
| 2009/0094316 A1* | 4/2009 | Chen et al. | 709/203 |

OTHER PUBLICATIONS

Java Virtual Machine Profiler Interface (JVMPI), retrieved on line <http://web.archive.org/web/20041010114506/http://java.sun.com.j2se/1/4/2/docs/guide/jvmpi/jvmpi.html>, archive data: 2004, pp. 1-42.*

* cited by examiner

PROFILING INTERFACE ASSISTED CLASS LOADING FOR BYTE CODE INSTRUMENTED LOGIC

BACKGROUND OF THE INVENTION

1. Field of the Invention

The present invention relates to byte code instrumentation and more particularly to resolving references to objects referenced by byte code instrumented logic.

2. Description of the Related Art

Byte code instrumentation relates to the augmentation of existing byte code in a compiled object to produce a modified version of the compiled object. Byte code instrumentation often arises where an existing application is to be configured for performance monitoring and performance profiling. Whereas in the past, the application could be modified directly through a modification of source code to produce the instrumented form of the application, this presupposes the availability of the source code for an application. Byte code instrumentation has become prevalent particularly in the circumstance where one cannot access the source code for an application. In the latter circumstance, the application itself must be modified in compiled form subsequent to the invocation of the application, but prior to the execution of the application.

When classes are added to target byte code, it often becomes the case that class references arising from the byte code instrumentation of the target byte code cannot be located at run-time. Generally, a class may not be located where the class has not been included from the class path. When encountering a missing class referenced by the augmented logic of the target byte code, a "No Class Definition Found" exception can arise and the augmentation will fail.

In the past at least two solutions have been proposed to address the possibility that a class reference in an augmented form of target byte code cannot be found. One solution dictates that the referenced classes are added to a folder already listed in the class path. To add a referenced class to a folder already listed in the class path, however, can require substantial end user interaction with the command line or process environment thus making the use of such a tool intrusive. Yet, it is desirable to strive for an appearance of seamlessness in the operation of instrumented byte code.

A second solution directs the addition of the referenced class to an extension folder. The second solution, like the first solution, is not without its flaws. Specifically, in the second solution, the end user again is required to intervene by copying files to a virtual machine installation location which may be difficult to determine and may not be modifiable by the user. Also, reinstalling or upgrading the virtual machine can result in the loss of the referenced class in the extension folder. In the presence of multiple, installed virtual machines, the problem can be compounded. Finally, where a custom class loader has supplanted the system class loader, the custom class loader may lack a configuration for locating the referenced classes in the extension folder.

BRIEF SUMMARY OF THE INVENTION

Embodiments of the present invention address deficiencies of the art in respect to locating referenced classes for byte code instrumented logic and provide a novel and non-obvious method, system and computer program product for profiling interface assisted class loading for byte code instrumented logic. In one embodiment, a method for profiling interface assisted class loading for byte code instrumented logic can include identifying an extension class required for use by an embedded class and requesting a profiling interface agent to load the extension class in a virtual machine. The byte stream, in turn, can be instrumented with the embedded class and the instrumented byte stream can be instantiated in the virtual machine.

Requesting a profiling interface agent to load the extension class in a virtual machine can include producing a load remote class (LRC) request in a remote controller, inserting the extension class in a payload of the LRC request, transmitting the LRC request over a computer communications network to a complementary remote controller, and forwarding the LRC request to the profiling interface agent. Alternatively, requesting a profiling interface agent to load the extension class in a virtual machine can include generating a configuration file referencing the extension class, producing a request to load the extension class, transmitting the request directly to the profiling interface agent, and permitting the profiling interface agent to access the configuration file to retrieve the extension class for instantiation in the virtual machine.

In another embodiment, a data processing system for profiling interface assisted class loading for byte code instrumented logic can be provided. The system can include a development environment configured for byte code instrumentation of byte streams for instantiation in a virtual machine, such as a Java Virtual Machine (JVM). The system further can include a profiling interface agent, for example, a JVM profiling interface (JVMPI) compliant profiling interface agent. Finally, the system can include profiling assisted class loading logic coupled to the agent. The profiling assisted class loading logic can include program code enabled to identify an extension class required for use by an embedded class for a byte code instrumented byte stream and to request the profiling interface agent to load the extension class in the virtual machine.

Optionally, complementary remote controllers can be coupled to one another over a computer communications network. The complementary remote controllers can enable communications between the profiling interface assisted class loading logic and the profiling interface agent. Alternatively, a configuration file can be coupled to the profiling interface agent. The configuration file can specify a location of extension classes for loading by the profiling interface agent.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for profiling interface assisted class loading for byte code instrumented logic. In accordance with an embodiment of the present invention, a class to be embedded in a byte stream for instantiation in a virtual machine can be inspected to identify classes upon which the embedded class is dependent. Each of the identified classes can be provided to a profiling interface for loading in the virtual machine. Subsequently, the byte stream can be instrumented with the embedded class and instantiated within the virtual machine. In this way, the embedded class can be assured of having proper access to dependent classes without requiring command line gymnastics or extensive file manipulation on the part of an end user.

Figure 1:
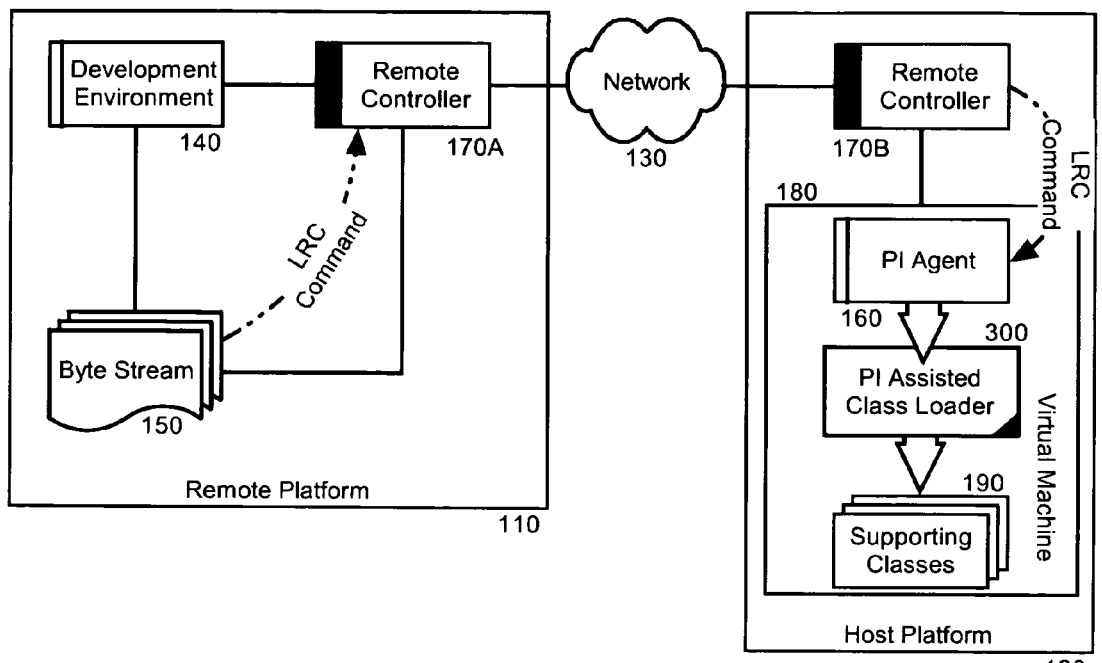
FIG. 1 is a schematic illustration of a data processing system configured for profiling interface assisted class loading for byte code instrumented logic across a remotely coupled development platform.

Notably, the byte code instrumentation of the byte stream can be performed remotely as between a remote development platform and a host platform for the byte stream, or unitarily within a single host platform. Considering first the remote development platform embodiment, FIG. 1 is a schematic illustration of a data processing system configured for profiling interface assisted class loading for byte code instrumented logic across a remotely coupled development platform. As shown in FIG. 1, a remote computing platform 110 can be communicatively coupled to a host computing platform 120 over a computer communications network 130.

The remote computing platform 110 can include a development environment 140 configured to byte code instrument a byte stream 150 intended for execution in a virtual machine 180 within the host computing platform 120. The host computing platform 120, in turn, can include a profiling interface class loading logic 300 enabled to communicate with a profiling interface agent 160, for example, a Java Virtual Machine Profiling Interface (JVMPI) agent, within the virtual machine 180. Specifically, the development environment 140 can be enabled to communicate with the profiling interface agent 160 through complementary remote controllers 170A, 170B which can exchange commands over the computer communications network 130 as is well known in the art.

In operation, the byte stream 150 can be byte code instrumented in the development environment 140 through the addition of one or more embedded classes. The development environment can forward a request to a remote controller 170A to remotely load the the byte stream 150 in the virtual machine 180 of the host platform 120. For example, the request can be a LOAD_REMOTE_CLASS request which can include a payload. The remote controller 170A, in turn, can provide the request over the computer communications network 130 to the remote controller 170B in the host computing platform 120. The remote controller 170B, can receive the request and can issue the request to the profiling agent 160 within the virtual machine 180.

The profiling agent 160 can receive the request from the remote controller 170B and can issue a request to the profiling interface class loading logic 300 which can identify dependent classes required for the proper operation of the instrumented byte stream 150. For each of the dependent classes 190, the profiling interface class loading logic 300 can instantiate the dependent class 190 within the heap of the virtual machine 180. In the Java context, the profiling interface class loading logic 300 can call the Java Native Interface (JNI) method DefineClass. The DefineClass directive invokes the system class loader so long as a NULL argument as passed in to the method as part of the function call. Finally, once the dependent class 190 has been instantiated with the virtual machine 180, the profiling interface class loading logic 300 can create a global reference to the dependent class 190 in order to protect the embedded class 190 from garbage collection. Consequently, the dependent class 190 can be treated as a system class for the duration of operation of the program represented by the byte code instrumented byte stream 150.

Figure 2:
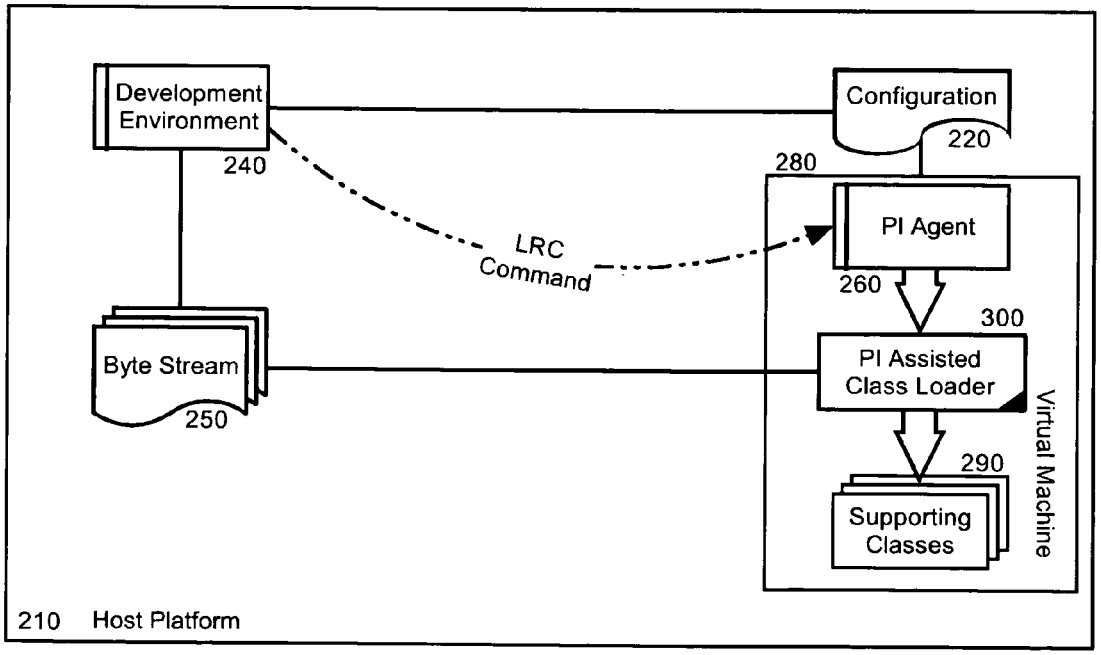
FIG. 2 is a schematic illustration of a data processing system configured for profiling interface assisted class loading for byte code instrumented logic within a single development platform; and, FIG. 3 is a flow chart illustrating a process for profiling interface assisted class loading for byte code instrumented logic.

Importantly, in another embodiment of the invention, a unitary configuration can be provided for the byte code instrumentation of a byte stream. In this regard, FIG. 2 is a schematic illustration of a data processing system configured for profiling interface assisted class loading for byte code instrumented logic within a single development platform. As shown in FIG. 2, the development environment 240 and the virtual machine 280 can reside in the same host computing platform 210. As before, the byte stream 250 can be byte code instrumented in the development environment 240 through the addition of one or more embedded classes. A request can be received to instantiate the byte stream 250 in the virtual machine 280 and can issue a request to load the byte stream 250 in the virtual machine 280.

The profiling interface class loading logic 300 can receive the request and can identify dependent classes required for the proper operation of the embedded classes and, for each dependent class, can load the dependent class within the virtual machine 280. Specifically, the profiling interface class loading logic 300 can retrieve a copy of each dependent class by reference to a configuration file 220. Subsequently, the profiling interface class loading logic 300 can instantiate the dependent class 290 within the heap of the virtual machine 280. Finally, once the dependent class 290 has been instantiated with the virtual machine 280, the profiling interface class loading logic 300 can create a global reference to the dependent class 290 in order to protect the dependent class 290 from garbage collection. Consequently, as before, the embedded class 290 can be treated as a system class for the duration of operation of the program represented by the byte code instrumented byte stream 250.

Figure 3:
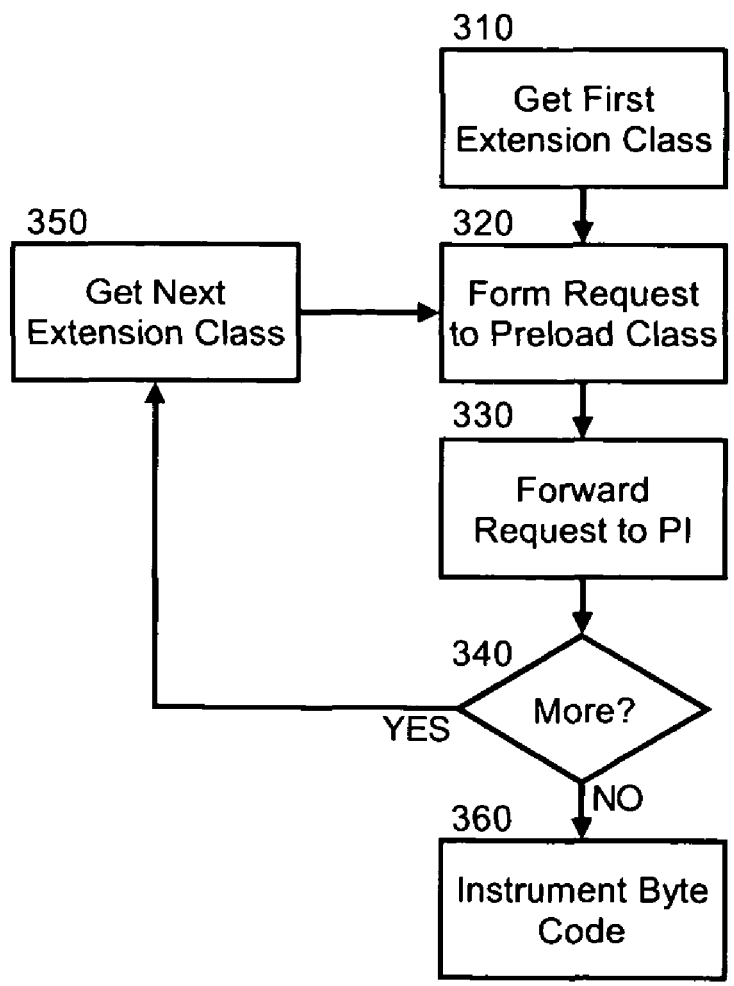

Turning now to FIG. 3, a flow chart is shown which illustrates a process for profiling interface assisted class loading for byte code instrumented logic in both configurations of FIGS. 1 and 2. Beginning in block 310, a first extension class can be identified which is required for the proper operation of an embedded class in a byte code instrumented byte stream. In block 320, a request can be formulated for preloading the extension class and in block 330 the request can be forwarded to the profiling interface which can load the extension class using the system class loader for the virtual machine.

In decision block 340, if additional extension classes are required, the process can repeat for each additional extension class. Once all extension classes have been instantiated in the virtual machine, the byte stream can be instrumented with the embedded class and an instance of the instrumented byte stream can be loaded in the virtual machine. Finally, the instrumented byte stream can execute with the assurance that the required extensions are available for use by the instrumented byte stream.

Several advantages of the foregoing inventive arrangements will be recognized by the skilled artisan. First, the inventive arrangements does not require the additional configuration of the virtual machine for specifying the location of required extension classes. Second, the extension class can be loaded by a system class loader thus eliminating class loader impedance and type casting limitations for native methods that may be implemented in the extension class. Third, the extension class can be loaded remotely on demand from a development environment workbench or other remote agent controller client.

Importantly, the extension class can be completely transient. Specifically, the extension class need not be saved as a file. Rather, the extension class can be dynamically created in memory and later deployed. Finally, security for byte code instrumentation can be enhanced as the extension classes can be loaded only if the virtual machine executes in cooperation with an enabled profiling interface agent. Consequently, there are no permanent extension libraries that can be exploited by malicious code. Also, the instrumented code need not invoke the system class loader in the virtual machine. Thus, no policy changes for the virtual machine are required.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, or transport the program for use by or in connection with the instruction execution system, apparatus, or device. The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for profiling interface assisted class loading for byte code instrumented logic, the method comprising:
   identifying an extension class required for use by an embedded class in development environment executing in memory by a processor of a host computing platform;
   generating a configuration file referencing location of the extension class;
   requesting a profiling interface agent to load the extension class in a virtual machine;
   instrumenting a byte stream with the embedded class in the development environment; and,
   instantiating the instrumented byte stream in the virtual machine.

2. The method of claim 1, wherein the requesting of a profiling interface agent to load the extension class in a virtual machine comprises:
   producing a load remote class (LRC) request in a remote controller;
   inserting the extension class in a payload of the LRC request;
   transmitting the LRC request over a computer communications network to a complementary remote controller; and,
   forwarding the LRC request to the profiling interface agent.

3. The method of claim 1, wherein the requesting of a profiling interface agent to load the extension class in a virtual machine comprises:
   producing a request to load the extension class;
   transmitting the request directly to the profiling interface agent; and,
   permitting the profiling interface agent to access the configuration file to retrieve the extension class for instantiation in the virtual machine.

4. The method of claim 1, further comprising using a system class loader for the virtual machine to load the extension class.

5. The method of claim 1, further comprising creating a global reference to the extension class in the virtual machine to protect the extension class from garbage collection.

6. A data processing system for profiling interface assisted class loading for byte code instrumented logic, the system comprising:
   a host computing platform with processor and memory;
   a development environment executing in the host computing platform, the environment being configured for byte code instrumentation of byte streams for instantiation in a virtual machine;
   a profiling interface agent;
   a configuration file coupled to the profiling interface agent, the configuration file specifying a location of extension classes for loading by the profiling interface agent, and,
   profiling assisted class loading logic coupled to the agent, the profiling assisted class loading logic comprising program code enabled to identify an extension class required for use by an embedded class for a byte code instrumented byte stream and to request the profiling interface agent to load the extension class in the virtual machine.

7. The system of claim 6, wherein the virtual machine is a Java Virtual Machine (JVM) and wherein the profiling interface agent is a JVM Profiling Interface (JVMPI) compliant profiling interface agent.

8. The system of claim 6, further comprising complementary remote controllers coupled to one another over a computer communications network and enabling communications between the profiling interface assisted class loading logic and the profiling interface agent.

9. A computer program product comprising a computer usable medium having computer usable program code for profiling interface assisted class loading for byte code instrumented logic, said computer program product including:

computer usable program code for identifying an extension class required for use by an embedded class;

computer usable program code for requesting a profiling interface agent to load the extension class in a virtual machine;

computer usable program code for generating a configuration file referencing the extension class;

computer usable program code for instrumenting a byte stream with the embedded class; and, computer usable program code for instantiating the instrumented byte stream in the virtual machine.

10. The computer program product of claim 9, wherein the computer usable program code for requesting of a profiling interface agent to load the extension class in a virtual machine comprises:

computer usable program code for producing a load remote class (LRC) request in a remote controller;

computer usable program code for inserting the extension class in a payload of the LRC request;

computer usable program code for transmitting the LRC request over a computer communications network to a complementary remote controller; and, computer usable program code for forwarding the LRC request to the profiling interface agent.

11. The computer program product of claim 9, wherein the computer usable program code for requesting of a profiling interface agent to load the extension class in a virtual machine comprises:

computer usable program code for producing a request to load the extension class;

computer usable program code for transmitting the request directly to the profiling interface agent; and, computer usable program code for permitting the profiling interface agent to access the configuration file to retrieve the extension class for instantiation in the virtual machine.

12. The computer program product of claim 9, further comprising computer usable program code for using a system class loader for the virtual machine to load the extension class.

13. The computer program product of claim 9, further comprising computer usable program code for creating a global reference to the extension class in the virtual machine to protect the extension class from garbage collection.

* * * * *